United States Patent [19]

Coad

[11] 4,380,479
[45] Apr. 19, 1983

[54] FOILS OF BRITTLE ALLOYS

[75] Inventor: Brian C. Coad, San Francisco, Calif.

[73] Assignee: GTE Products Corporation, Stamford, Conn.

[21] Appl. No.: 332,430

[22] Filed: Dec. 21, 1981

[51] Int. Cl.³ .............................................. B22F 7/04
[52] U.S. Cl. ........................ 148/11.5 P; 148/11.5 Q; 148/11.5 N; 427/376.3; 427/376.4
[58] Field of Search ................. 148/11.5 P, 11.5 Q, 148/11.5 N; 427/350, 360, 376.2, 376.3, 376.4, 376.5, 376.6, 376.7, 376.8

[56] References Cited

U.S. PATENT DOCUMENTS 3,310,870 3/1967 Parikh et al. ...................... 427/360
3,776,769 12/1973 Buck et al. ...................... 427/376.3
4,312,896 1/1982 Armstrong ...................... 427/376.6

Primary Examiner—W. Stallard
Attorney, Agent, or Firm—Donald R. Castle

[57] ABSTRACT

Nickel based brazing alloys containing embrittling additives are made by depositing a powder blend on a nickel substrate and roll compacting to form an alloy foil having the desired metallurgical content.

5 Claims, No Drawings

FOILS OF BRITTLE ALLOYS

FIELD OF THE INVENTION

This invention relates to foils and preforms of nickel-boron-silicon alloys. More particularly it relates to a process for producing foils and preforms of the aforementioned inherently brittle nickel base alloys containing boron and silicon.

BACKGROUND

Nickel base alloys containing boron to lower the melting point are widely used to braze ferrous and nickel base superalloys in the temperature range 970°-1200° C. These alloys, which include particularly the family of alloys specified by the society of automotive engineers in aeronautical materials specifications-(AMS) 4775–4779, and many more or less proprietary varients of these alloys, generally contain silicon in addition to boron, as a melting temperature depressant, and often include chromium, iron and other elements. These alloys contain metallic borides and silicides which render them extremely hard and brittle in the cast state.

Certain brazing alloys such as AMS 4779 (consisting principally of nickel, silicon and boron) described in Aerospace Material Specifications published June 30, 1960 by Society of Automatic Engineers, Inc. are extremely hard and brittle and therefore cannot readily be cold worked into suitable form, such as wire or strip, for placement in a metal joint to be brazed. In the past, such brazing alloys have been formed by grinding or atomizing the elements into a powder and mixing the powder with a suitable organic binder which holds the powder granules together in strip or wire from convenient for handling and placement. The disadvantage of brazing alloys in this form is that the organic binder on heating decomposes and gives off gases which, if evolved too rapidly, can displace or "blow away" some of the metallic brazing alloy powder. Since the brazing operation is commonly performed in hydrogen or argon or in a vacuum, the decomposition of the organic binder is seldom if ever complete and as a consequence a carbonaceous residue is left in the braze joint. This residue can inhibit the flow of the molten brazing alloy, resulting in an incompletely brazed or filled joint. A further disadvantage is that the organic-bonded powder form of alloy undergoes a reduction in volume during the brazing process which renders such alloys unsuitable for applications requiring precise prepositioning of the parts to be joined. Thus even alloy AMS 4779, which has the lowest boron and silicon content of this family of alloys, cannot practicably be rolled, hot or cold, to form foil.

In brazing applications, these alloys are widely applied in the form of a fine powder suspended in a viscous vehicle to form a paste. Metering of paste to give a precise, desired quantity of alloy at the brazing site is not easy. Generally, an excess of paste is used, over the minimum alloy quantity needed to form the braze. Besides additional cost, this excess may cause erosion problems or may result in flow of the brazing alloy to areas where its presence is undesirable. Moreover, the past vehicle may contaminate the braze alloy with undesirable impurities. It would often be preferred to use a brazing alloy preform blanked or etched from foil. However, present foil making processes are costly, and economics are presently weighted in favor of the use of powdered alloys.

It is known that when alloys of this class are rapidly solidified from the liquid state, the formation of embrittling compounds can be suppressed, and a ductile product is developed. Such materials, known as metallic glasses, are described, for example, in the book "Metallic Glasses", American Society for Metals, 1978.

In a typical process for making powder of these alloys, a liquid stream of the alloy is disrupted into particles by an impinging stream of gas (which may be nitrogen, 95% nitrogen, 5% hydrogen, etc.) or water. This process has been widely used for many years. The cooling rate of particles or alloy formed in this process was expected to be high, but it was not known whether the rate would be high enough to impart ductility to the particles.

Another method to make a foil is to form a flexible tape. Atomized nickel base alloy powder is suspended in an organic fluid containing wheat is, in effect, a glue. The resulting slurry is deposited on a plastic carrier strip by, for example, a doctor blade. In subsequent drying step, the organic carrier is removed, while the residual organic binder holds the particles together in a coherent strip. Removal of the binder causes problems as with powders and pastes.

The initial steps of a doctor blade, foil process are similar to those of the flexible tape process. A steel substrate is substituted for the plastic substrate. Nickel alloy powder is suspended in an organic vehicle to form a slurry. The organic binder which is necessary to the flexible tape process is omitted from the slurry.

Slurry is dispensed from a doctor blade arrangement to the steel substrate, passes through a drying system which removes the carrier vehicle, and then into a controlled atmosphere furnace, where the braze alloy is melted. In a separate operation, steel is removed from the braze alloy by chemical etching. Iron contamination can occur by solution of iron from the substrate.

In addition, borided foil is made by adding boron to the surface of a rolled ductile nickel alloy foil which contains all the constituents of the final brazing alloy except boron.

Boriding proceses which have been used include:
Gaseous (C.V.D.) deposition from diborane.
Physical vapour deposition (P.V.D.).
Solid pack boriding from boron carbide.
Electroboronizing from a salt bath.
Chemical deposition from molten borox.

Deposited boron is generally reacted with the substrate to form a nickel boride layer which is extremely well-bonded to the substrate.

Most of the boriding processes can be applied to any form of substrate, including wire and preformed parts. The step is not homogeneous, however.

U.S. Pat. No. 3,786,854 describes another method of making foils of these alloys by applying a paste of such alloys to a steel substrate, melting to form a homogeneous layer on the substrate, and subsequently etching away the steel to leave homogeneous alloy foil.

The resulting foil can be contaminated with iron by diffusion from the substrate. Etching of the steel from the substrate is difficult, particularly as the foil hs a cast structure, and is often very brittle.

SUMMARY OF THE INVENTION

In accordance with one aspect of this invention there is provided a process for producing nickel base brazing metal foils of a predetermined metallurgical content which comprises forming a relatively uniform powder blend containing nickel and other elements, depositing said blend relatively uniformly on a nickel strip and passing the blend and strip through the rolls of a rolling mill to achieve at least a 3% elongation of the nickel strip to form a foil of the predetermined metallurgical content.

DETAILS OF THE PREFERRED EMBODIMENTS

For a better understanding of the present invention, together with other and further objects, advantages and capabilities thereof, reference is made to the following disclosure and appended claims in connection with the above description of some of the aspects of the invention.

The following sequence of operations is preferably utilized in carrying out the process of this invention.

A powder blending containing nickel and other desired elements adjusted for the nickel content of the substrate to which the powder blend is to be ultimately bonded is prepared. The particle size of blend is such that all of the particles pass through a 325 mesh screen. A slurry or paste containing the blend is then prepared. Conventional vehicles used in brazing pastes is a satisfactory media because they can readily be removed in a subsequent operation. The paste is uniformly deposited on a nickel substrate. The substrate can vary in thickness from about 0.0005 inches to about 0.001 inches. The ratio of the thickness powder blend, on a 100% dense basis, to the thickness of the substrate can vary from about 2:1 to about 22:1. It is believed to be clear that if it is desired to produce the aforementioned AMS 4779 alloy which contains about 1.8% by weight of boron, about 3.5% by weight of silicon and 94.7% by weight of nickel and the aforedescribed thickness ratio is about 2:1, then the blend would contain about 2.72% by weight of boron, 5.3% by weight of silicon and about 91.98% by weight of nickel to achieve a foil having the composition limits for AMS 4779. If the foregoing thickness ratio is about 12:1, the blend would contain 1.9% by weight of boron, about 3.8% by weight of silicon and about 94.3% by weight of nickel.

After the paste or slurry is deposited on the nickel substrate, the substrate and deposit is heated to about 180° C. to evolve the binder and then is rolled to achieve at least about 3% elongation of the substrate to insure adequate bonding of the blend to the substrate. From about 5% about 15% elongation of the substrate is preferred.

After bonding the article is annealed in an inert atmosphere or in a vacuum for at least about 1 minute at a temperature of from about 750° C. to about 950° C. The annealed material is preferably passed through the rolls of the bonding mill to achieve an additional elongation of from about 10% to about 25%. If a thinner foil is desired, the material can be re-annealed and re-rolled to the desired thickness.

While any nickel based brazing alloys can be prepared by the process of this invention, it is particularly suitable for producing the nickel-boron-silicon alloys such as AMS 4776, 4777, 4778, and 4779 and the nickel-silicon alloys such as 4782 and 4783.

In order to more fully illustrate the subject invention the following detailed example is presented. All parts, percentages and proportions are by weight unless otherwise indicated.

EXAMPLE 1

A powder blend having particles which pass through a 325 mesh screen is prepared by a conventional method for making powder blends. The blend contains 2.9% boron, 4.5% silicon, balance nickel. About 85 parts of the blend is blended with about 15 parts of a conventional organic binder which is volatile at about 180° C. and is used in brazing pastes. The paste is deposited to a thickness of about 0.022 inches on a nickel substrate having a thickness of about 0.001 inches. The substrate and deposit are roll bonded to achieve a thickness about 0.013 inches. The bonded foil is heat treated for about 40–50 minutes in a vacuum at about 790° C. and then re-rolled to achieve a thickness of about 0.010 inches. The re-rolled material is heat treated in a vacuum at about 900° C. for about 30 minutes. The material has a boron content of about 2.63% and a silicon content of about 4.05% which is within the specifications for AMS 4778A alloys. Washers, having a 0.75 inches outside diameter and 0.625 inches inside diameter are stamped from the foil. The washers using conventional brazing techniques formed a bond with stainless steel alloys indistinguishable from a bond with conventional AMS 4778A alloy.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for making a nickel-base brazing foil containing nickel and other elements in a predetermined metallurgical content said process comprising
    (a) forming a relatively uniform powder blend containing nickel and said other elements,
    (b) depositing said blend relatively uniformly on a nickel strip, and
    (c) passing said blend and said strip through the rolls of a rolling mill to achieve at least about 3% elongation of the nickel strip to form a foil of said predetermined metallurgical context.

2. A process according to claim 1 wherein the ratio of thickness of said powder blend on a 100% dense basis to the thickness of said nickel strip varies from about 2:1 to about 22:1.

3. A process according to claim 1 wherein said elongation is from about 5% to about 15%.

4. A process according to claim 1 wherein said blend is deposited as a paste and then is heated to about 180° C. just to rolling.

5. A process according to claim 4 wherein said foil is annealed at a temperature of from about 750° C. to about 950° C. in an inert atmosphere or in a vacuum.

* * * * *